United States Patent [19]

Scott et al.

[11] 4,137,463

[45] Jan. 30, 1979

[54] CONTROL SYSTEM UTILIZING MOMENTARY SWITCHING DEVICES

[75] Inventors: Charles E. Scott, Noblesville; James E. Small, Indianapolis, both of Ind.

[73] Assignee: P.R. Mallory & Co. Inc., Indianapolis, Ind.

[21] Appl. No.: 807,009

[22] Filed: Jun. 16, 1977

[51] Int. Cl.² .................................. H03K 19/08
[52] U.S. Cl. ........................ 307/141; 307/293; 328/130; 328/34; 355/14; 355/40; 340/147 C
[58] Field of Search .................... 307/141, 98, 141.4, 307/140, 142, 293, 269; 328/129; 219/490, 492, 506, 507; 340/147 R; 361/198

[56] References Cited

U.S. PATENT DOCUMENTS

| | | | |
|---|---|---|---|
| 3,767,937 | 10/1973 | Schmidgall | 361/198 |
| 3,774,056 | 11/1973 | Sample | 307/141 |
| 3,922,889 | 12/1975 | Karklys | 307/141 |
| 3,973,135 | 8/1976 | Scott | 307/141 |
| 3,989,374 | 11/1976 | Latka | 307/293 |
| 4,001,599 | 1/1977 | Karklys | 134/57 D |

Primary Examiner—George H. Miller, Jr.
Assistant Examiner—S. D. Schreyer
Attorney, Agent, or Firm—Hoffmann, Meyer & Coles

[57] ABSTRACT

A control system, for a machine and the like having at least one cycle made up of at least two events, utilizes momentary switching devices to actuate each cycle. The control system includes a control circuit having momentary switching devices, digital circuitry for latching the control circuit in various modes of operation, and timing circuitry responsive to the digital circuitry for timing at least one event of the cycle; and gate circuit means controlled by semiconductor switching devices for regulating at least another event of the cycle in response to the control circuit.

41 Claims, 8 Drawing Figures

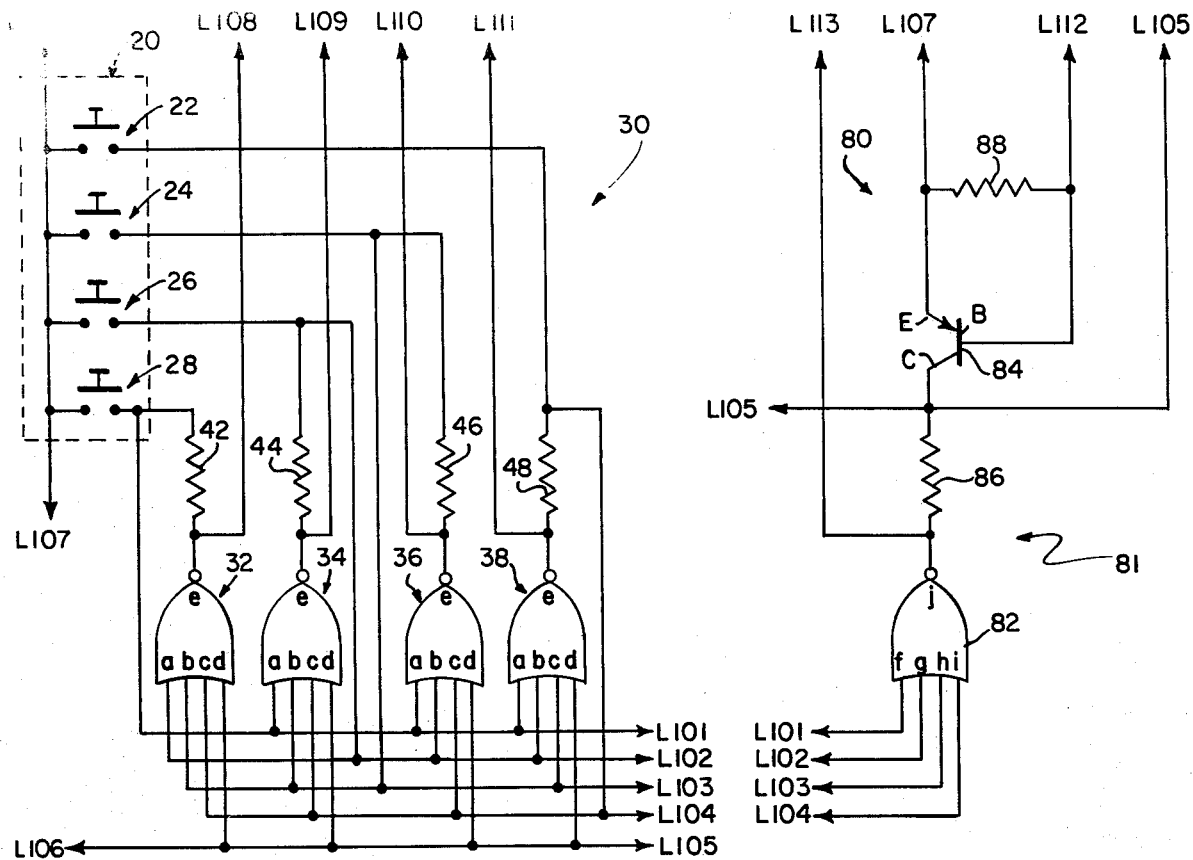
FIG. 3
FIG. 4
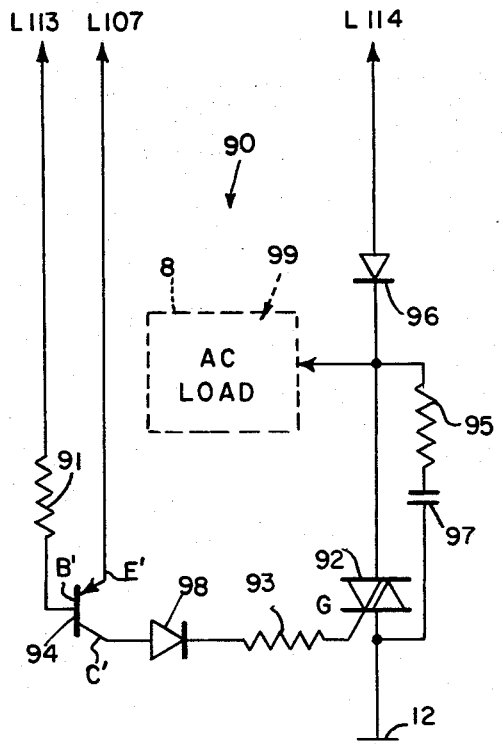
FIG. 6
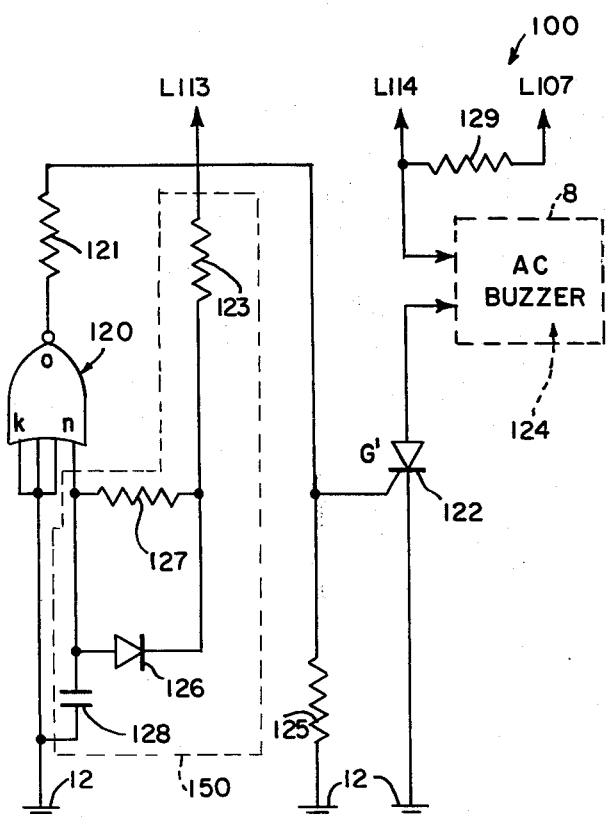
FIG. 7

CONTROL SYSTEM UTILIZING MOMENTARY SWITCHING DEVICES

BACKGROUND OF THE INVENTION

1. Field of the Invention

This invention relates to control systems for machines and the like of the type having at least one cycle made up of at least two events and is more particularly concerned with control systems utilizing momentary switching devices to actuate the machine cycle.

Generally speaking, the control system of the present invention includes a control circuit having momentary switching devices, digital circuitry for latching the control circuit in various modes of operation, and timing circuitry responsive to the digital circuitry for timing at least one of the events of the cycle; and gate circuit means controlled by semiconductor switching devices for regulating at least another event of the cycle in response to the control circuit.

2. Description of the Prior Art

U.S. Pat. Nos. 3,767,937 and 3,973,135 assigned to P. R. Mallory & Co. Inc., disclose control systems which include control circuits having timing means and other circuitry for controlling machines and the like having at least one cycle made up of at least one event. However, these patents disclose the use of pushbutton controls which latch in an on position when pushed or pulled and are then released or latch in an off position in response to a solenoid release. Accordingly, the control circuits as disclosed in the aforementioned patents are latched into at least one operational mode by state of the art mechanical switching devices. Because of cost, reliability and esthetics, it has become desirable to utilize momentary switching devices such as keyboard type switches or electronic touch switches in place of the latching mechanical type switches described above. Since momentary switching devices do not latch, other means must be utilized to latch the control circuit in an operation mode. One such means is to utilize digital circuitry.

Control circuits utilizing momentary switching devices are per se old in the art; as will be recognized by reference to the recently issued U.S. Pat. No. 4,001,599; however, various means may be utilized to implement the momentary signal produced by such switching devices.

Additionally, the timing means associated with control systems such as those disclosed in U.S. Pat. Nos. 3,767,937 and 3,973,135 have generally utilized an oscillator circuit in conjunction with a resistance capacitance timing network in order to provide the timing period for each cycle. Utilization of such timing means has necessitated the use of mechanical switching devices having double contacts i.e. one to latch the control circuit in an operational mode and one to select the appropriate resistance capacitance combination for a desired timing period.

In general, the use of oscillator circuits which produce a series of electrical pulses that are in turn counted in order to derive a timing period for a particular cycle of a machine is old in the art; as will be recognized by reference to U.S. Pat. Nos. 3,774,056 and 4,001,599; however, in most of these instances where counters are used, a time period is predicated solely upon the number of pulses received and/or counted and not upon the frequency of such pulses.

Generally speaking, therefore, the present invention represents an improvement upon the control systems as disclosed in U.S. Pat. Nos. 3,767,937 and 3,973,135 wherein momentary switching devices are utilized and digital circuitry latches a control circuit in at least one mode of operation.

SUMMARY OF THE INVENTION

In accordance with the present invention in its broadest concept, there is provided a control system utilizing momentary switching devices to activate a control circuit which latches in at least one mode of operation thereby controlling the activation and deactivation of at least two machine events.

It is an object of the present invention to provide a control circuit having programming means which includes momentary switching devices for providing momentary signals to actuate at least one cycle of a machine.

It is a further object of the present invention to provide a control circuit including momentary switching devices, digital circuitry responsive to the momentary switching devices for latching the control circuit in various modes of operation, and timing circuitry responsive to the digital circuitry for timing at least one event of a machine cycle.

Yet another object of the present invention is to provide a timing means which includes an oscillator circuit means wherein the oscillator circuit means has a switching means for activating the oscillator circuit means, a clock responsive to the switching means for generating a series of electrical pulses, and impedance means for defining a plurality of selectable frequencies of the electrical pulses such that a timing period of an event is determined by the frequency of the electrical pulses.

Still yet another object of the present invention is to provide a timing means for a control circuit which includes oscillator circuit means for deriving a timing period of an event and a counter responsive to the oscillator circuit means for signalling the end of the event upon receiving a predetermined number of electrical pulses generated by the oscillator circuit means.

It is still another object of the present invention to provide a control system for a machine and the like having at least one cycle made up of at least two events which includes a power supply source, a control circuit responsive to the power supply source having programming means for actuating the cycle, first gate circuit means for latching the control circuit in at least one mode of operation, timing means responsive to the first gate circuit means for timing a first event of the machine, and function control means responsive to the timing means wherein the function control means includes second gate circuit means for latching the control circuit in at least another mode of operation; and third gate circuit means responsive to the function control means for regulating a second event of the machine.

Still a further object of the present invention is to provide a control system as described above which further includes a switching means electrically coupled to the third gate circuit means and to the first event of the machine for administering a sequential activation and deactivation of the first and second events of the machine.

Other objects and advantages of the invention will be apparent from the following detailed description of a preferred embodiment thereof, which description should be considered in conjunction with the accompanying drawings in which:

BRIEF DESCRIPTION OF THE DRAWINGS

FIG. 3 is a schematic logic diagram of a means for latching a control circuit in at least one mode of operation which may be employed in the control system of FIG. 2.

FIG. 4 is a schematic logic diagram of a means for latching a control circuit in at least another mode of operation which may be employed in the control system of FIG. 2.

FIG. 6 is a schematic representation of a means for administering a sequential operation of events being controlled by the control system of FIG. 2.

FIG. 7 is a logic representation of a means for regulating the activation and deactivation of at least one event being controlled by the control system of FIG. 2.

DESCRIPTION OF THE PREFERRED EMBODIMENT

Figure 1:
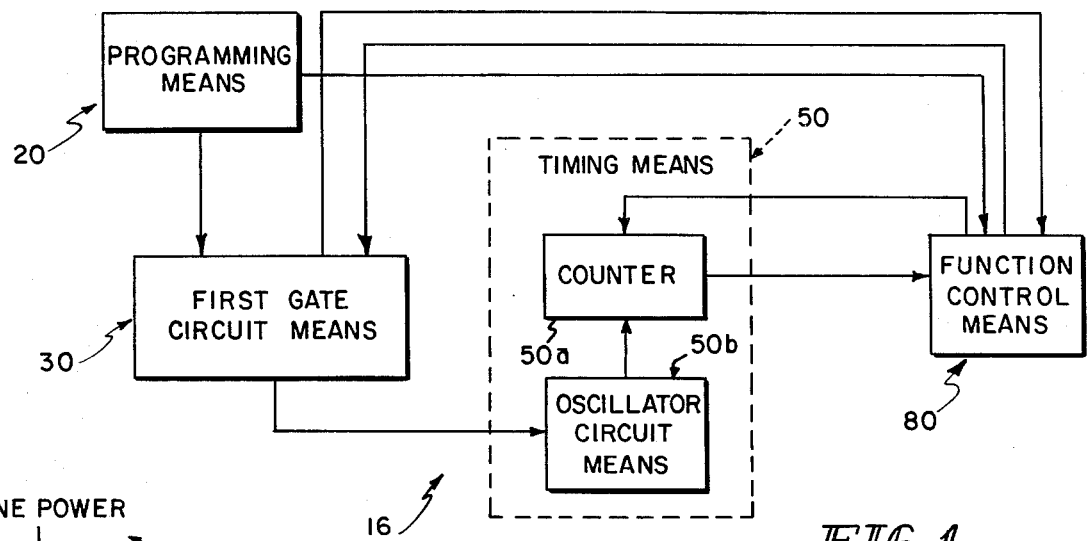
FIG. 1 is a schematic block diagram of a control circuit constructed in accordance with the present invention.

A control circuit 16 in accordance with the present invention for controlling at least one cycle of a machine and the like wherein the cycle includes at least one event is illustrated in FIG. 1 as a block diagram. The control circuit 16 includes programming means 20, first gate circuit means 30 responsive to programming means 20, timing means 50 responsive to first gate circuit means 30, the timing means 50 including oscillator circuit means 50b and a counter 50a responsive to oscillator circuit means 50b, and function control means 80 responsive to timing means 50 and first gate circuit means 30. Furthermore, as shown in FIG. 1, timing means 50 and first gate circuit means 30 are both responsive to function control means 80 and function control means 80 is further responsive to programming means 20.

Figure 2:
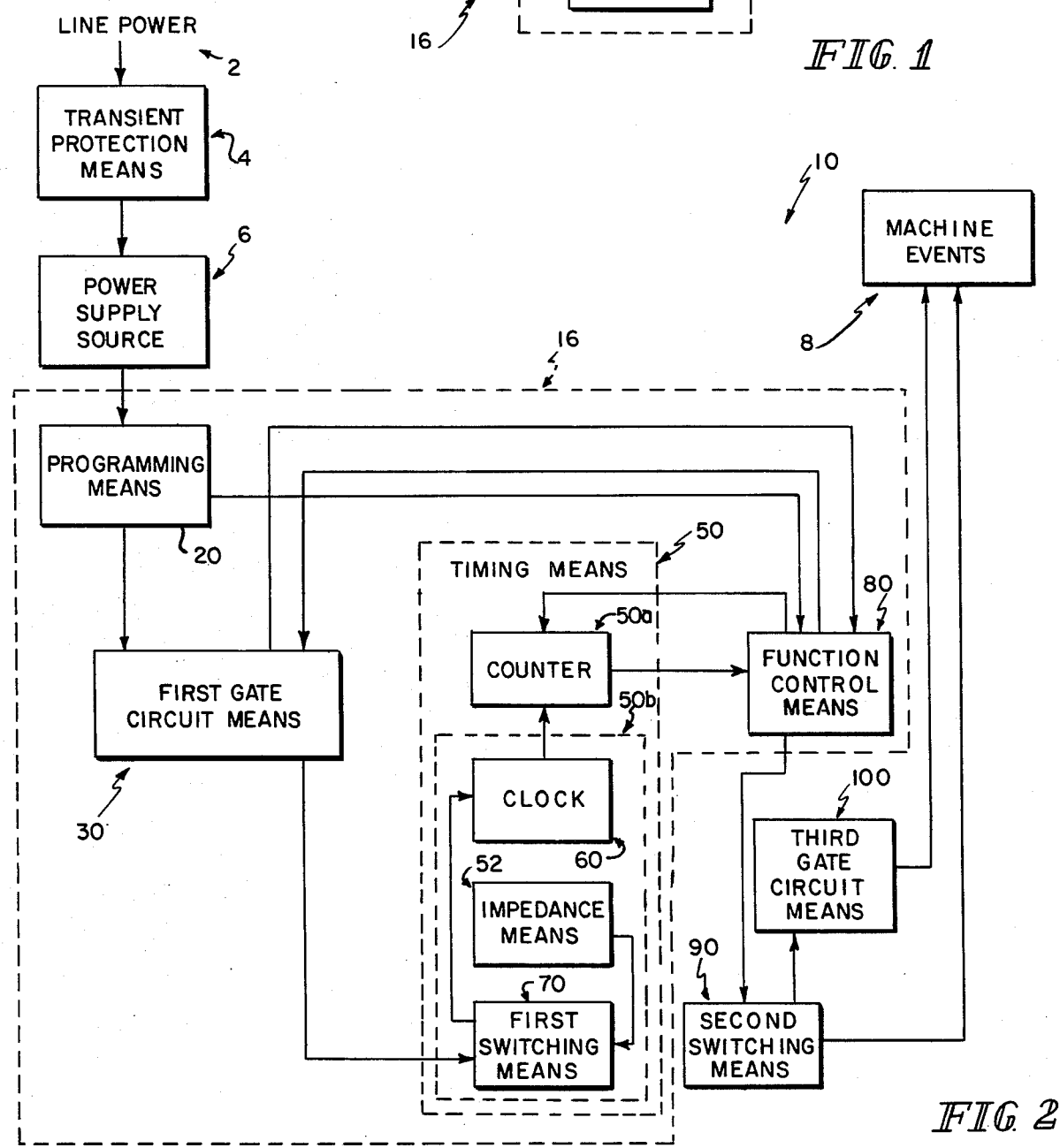
FIG. 2 is a schematic block diagram of a control system of the present invention which embodies the control circuit of FIG. 1.

Referring now to FIG. 2 a control system 10 in accordance with the present invention for controlling at least one cycle of a machine and the like wherein the cycle includes at least two events 8 includes a power supply source 6 responsive to an external source of power 2; transient protection means 4 for assuring a smooth transition from line power 2 to power supply source 6; a control circuit 16 as described hereinabove wherein the timing means 50 of control circuit 16 comprises oscillator circuit means 50b responsive to an electrical signal for deriving a timing period for at least one of the events 8 of the cycle and oscillator circuit means 50b includes first switching means 70 electrically coupled to first gate circuit means 30 for activating oscillator circuit means 50b, a clock 60 responsive to first switching means 70 for generating a series of electrical pulses, and impedance means 52 electrically coupled to first switching means 70 and clock 60 for defining a plurality of selectable frequencies of the electrical pulses, and further comprises a counter 50a responsive to oscillator circuit means 50b for signalling the end of a first event 8 in response to a predetermined number of the pulses thereby causing function control means 80 to provide for the termination of the first event 8 and the initiation of a second event 8; second switching means 90 electrically coupled to the function control means 80 and the second event 8 for administering a sequential activation and deactivation of the first and second events 8, and third gate circuit means 100 responsive to the function control means 80 and electrically coupled to second switching means 90 and the second event 8 for regulating the second event 8 of the machine.

Illustrated in FIG. 3 are preferred embodiments of programming means 20 and first gate circuit means 30 of the control circuit 16 shown in FIG. 1. Programming means 20 includes four (4) momentarily operable switching devices 22,24,26, and 28 all of which are electrically coupled in parallel to a power supply source 6 by an electrical conduit L107. The switching devices 22,24,26, and 28 may be any momentarily operable switching devices. For example such switching devices may be momentary keyboard type switches or electronic touch control switches which when pushed do not latch but provide a momentary signal.

First gate circuit means 30 includes four (4) NOR gates 32,34,36, and 38 with each NOR gate having four (4) inputs a,b,c, and d and an output e. Each of the momentary switching devices 22,24,26, and 28 is electrically coupled to one input a,b, or c of three (3) of the four (4) NOR gates 32,34,36, and 38 by means of an electrical conduit L101, L102, L103, or L104 such that when one of the switches 22,24,26, or 28 is closed a logical one (1) is applied to three (3) of the four (4) NOR gates causing the three (3) NOR gates to make a logical zero (0) transition at each of their respective outputs e. The inputs d of each NOR gate 32,34,36, and 38 are electrically coupled to an electrical conduit L105 which is in turn electrically coupled to function control means 80 (FIG. 1). Each of the outputs e of NOR gates 32,34,36 and 38 are electrically coupled to one side of a resistance means 42,44,46, and 48 respectively. The other side of each resistance means 42,44,46, and 48 is electrically coupled to the electrical conduits L101, L102, L103, and L104 respectively such that the output e of NOR gate 32 is electrically coupled through resistance means 42 to the inputs a of NOR gates 34,36, and 38; the output e of NOR gate 34 is electrically coupled through resistance means 44 to the input a of NOR gate 32 and the inputs b of NOR gates 36 and 38; the output e of NOR gate 36 is electrically coupled through resistance means 46 to the inputs b of NOR gates 32 and 34 and the input c of NOR 38; and the output e of NOR gate 38 is electrically coupled through resistance means 48 to the inputs c of NOR gates 32,34, and 36. The resistance means 42,44,46, and 48 allow only a logical zero (0) to be transmitted from the outputs e of NOR gates 32,34,36, and 38 respectively to the inputs a,b, or c as described hereinabove. Furthermore, each of the outputs e of NOR gates 32,34,36, and 38 is electrically coupled to oscillator circuit means 50b (FIG. 1) by means of electrical conduits L108, L109, L110, and L111 respectively.

Referring now to FIG. 4 there is illustrated a preferred embodiment of function control means 80 of the control circuit 16 shown in FIG. 1. Function control means 80 includes a bipolar semiconductor switching device 84 which is preferably a PNP transistor and second gate circuit means 81. Second gate circuit means 81 includes a NOR gate 82 having four (4) inputs f,g,h, and i and an output j. Input f of NOR gate 82 is electrically coupled by means of an electrical conduit L101 to momentary switching device 28 and the output e of NOR gate 32, (See FIG. 3) such that when switching device 28 is momentarily closed a logical one (1) is applied to the input f causing NOR gate 82 to make a logical zero (0) transition at its output j. Input g of NOR gate 82 is electrically coupled by means of an electrical conduit L102 to momentary switching device 26 and the output e of NOR gate 34 (See FIG. 3) such that when switching device 26 is momentarily closed a logical one (1) is applied to the input g causing NOR gate 82 to make a logical zero (0) transition at its output j. Input h of NOR gate 82 is electrically coupled by means of an electrical conduit L103 to momentary switching device 24 and the output e of NOR gate 36 (See FIG. 3) such that when switching device 24 is momentarily closed a logical one (1) is applied to the input h causing NOR gate 82 to make a logical zero (0) transition at its output j. Input i of NOR gate 82 is electrically coupled by means of an electrical conduit L104 to momentary switching device 22 and the output e of NOR gate 38 (See FIG. 3) such that when switching device 22 is momentarily closed a logical one (1) is applied to the input i of NOR gate 82 causing it to make a logical zero (0) transition at its output j. Output j of NOR gate 82 may be electrically coupled directly to a machine event 8 to be controlled or indirectly to such machine event 8 through interfacing devices (not shown). In the preferred embodiment of control system 10 shown in FIG. 2, the output j of NOR gate 82 is shown to be electrically coupled to second switching means 90 (See FIG. 2) by means of an electrical conduit L113. Within the control circuit 16 (FIG. 1) the output j of NOR gate 82 is further electrically coupled through a resistance means 86 to the inputs d of NOR gates 32,34,36, and 38 by means of an electrical conduit L105. The resistance means 86 allows only a logical zero (0) to be transmitted from the output j of NOR gate 82 to the inputs d of NOR gates 32,34,36, and 38.

The PNP transistor 84 of function control means 80 has its emitter E electrically coupled to a power supply source 6 by means of an electrical conduit L107, its base B electrically coupled to an output of counter 50a (FIG. 1) by means of an electrical conduit L112 and to one side of a resistance means 88, and its collector electrically coupled to the counter 50a (FIG. 1) and to the inputs d of NOR gates 32,34,36, and 38 both by means of an electrical conduit L105.

Figure 5:
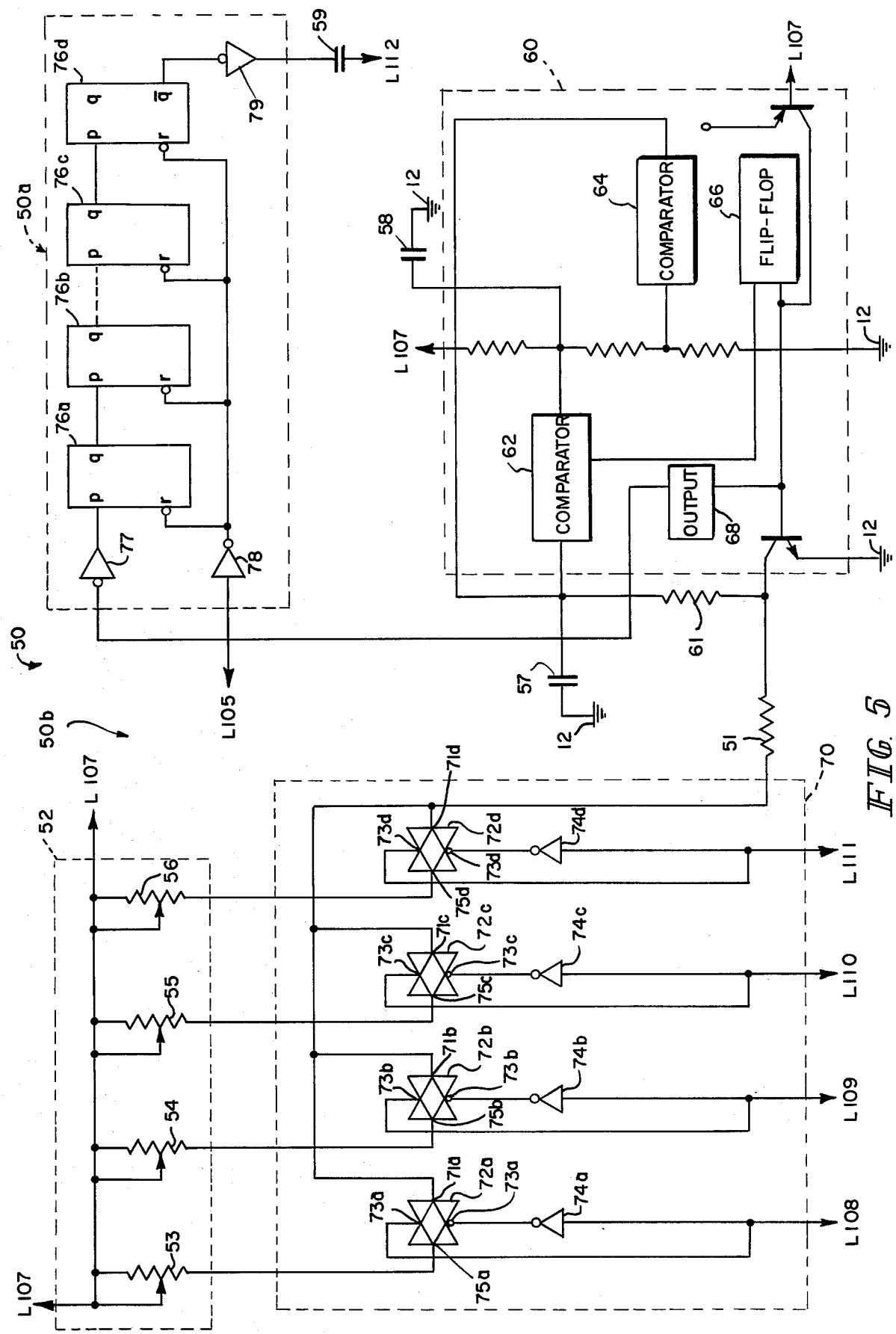
FIG. 5 is a schematic diagram of a means for timing at least one event being controlled by the control system of FIG. 2.

Illustrated in FIG. 5 is a preferred embodiment of timing means 50 of the control circuit 16 shown in FIGS. 1 and 2. Timing means 50 includes an oscillator circuit means 50b for deriving a timing period for events to be controlled by control circuit 16 and a counter 50a to determine when a timing period is complete and accordingly signal the termination of such events.

Oscillator circuit means 50b includes first switching means 70, a clock 60, and impedance means 52. First switching means 70 may include any conventional switches capable of controlling or implementing logical signals. The embodiment of timing means 50b shown in FIG. 5 includes four (4) bilateral switching devices 72a, 72b, 72c, and 72d which may be independent transmission gates. Each transmission gate has a unilateral input 75a, 75b, 75c, and 75d, a bilateral input 73a, 73b, 73c, and 73d, and an input 71a, 71b, 71c, and 71d. Each transmission gate is electrically coupled to an output e of a NOR gate 32,34,36, or 38 of first gate circuit means 30 by means of electrical conduits L108, L109, L110, or L111 respectively through its bilateral input 73a, 73b, 73c, and 73d and an inverter 74a, 74b, 74c, and 74d. The outputs 71a, 71b, 71c, and 71d of the transmission gates are electrically coupled through a resistance means 51 to the clock 60 and each unilateral input 75a, 75b, 75c, and 75d of the transmission gates is electrically coupled to impedance means 52 such that when a logical one (1) is transmitted from the output e of a NOR gate 32,34,36, or 38 the frequency of the output signal transmitted to the clock 60 is determined by the value of impedance means 52. Switching means 70 may be a quad-bilateral switch integrated circuit package of the type manufactured by Motorola Semiconductor Products, Inc., Phoenix, Ariz.

Clock 60 may include any conventional means for generating a series of electrical pulses in response to an electrical signal. The embodiment of clock 60 shown in FIG. 5 includes an integrated timing circuit package of the type manufactured by Motorola Semiconductor Products, Inc. which in itself includes two conventional comparators 62 and 64 and a conventional flip-flop 66 to provide the functions necessary for a complete timing circuit. The timing circuit package further includes an output 68. By electrically coupling capacitance means 57 and 58 and resistance means 61 to the integrated timing circuit package as illustrated, the timing circuit operates in an astable mode as an oscillator.

The integrated timing circuit as an oscillator uses as its timing elements an external resistance-capacitance network which includes capacitance means 57 and 58 and resistance means 61. Capacitance means 57 and 58 are electrically coupled to ground potential 12 and resistance means 61 has one side electrically coupled to resistance means 51 and another side electrically coupled to capacitance means 57. The output 68 of clock 60 is electrically coupled to counter 50a whereby a predetermined number of the electrical pulses generated by clock 60 may be received and counted.

Impedance means 52 includes four (4) variable resistance means 53,54,55, and 56 each having one of its sides electrically coupled to a power supply source 6 by means of an electrical conduit L107 and each having the other of its sides electrically coupled to a unilateral input 75a, 75b, 75c, and 75d respectively of a bilateral switching device 72a, 72b, 72c, or 72d. Variable resistance means 53,54,55, and 56 may be independently set to different resistance values such that the frequency of an output signal appearing at outputs 71a, 71b, 71c, or 71d of bilateral switching devices 72a, 72b, 72c, or 72d respectively will be different for each momentary switching device 22,24,26, and 28.

Counter 50a in the preferred embodiment is a seven stage binary ripple counter. For illustration purposes, only four (4) stages 76a, 76b, 76c, and 76d of the seven stages have been shown in FIG. 5. Each stage 76a, 76b, 76c, and 76d includes a conventional flip-flop having inputs p, outputs q, and reset inputs r. The series of electrical pulses generated by clock 60 are electrically coupled to counter 50a and within the counter 50a are passed through a buffer 77 prior to being transmitted to the input p of the first stage 76a. The output q of the seventh stage 76d of counter 50a is passed through a buffer 79 and electrically coupled through capacitance means 59 to the base B of bipolar semiconductor switching device 84 of function control means 80 (See FIG. 4) by means of an electrical conduit L112. The counter 50a is reset by a logical one (1) from the collector C of semiconductor switching device 84. A logical one (1) signal is transmitted from the collector C of semiconductor switching device 84 by means of an electrical conduit L105, passed through a buffer 78 and feed to a reset input r of each stage 76a, 76b, 76c, and 76d in order to reset the counter 50a. As connected in FIG. 5 counter 50a will count up to 128 counts. Accordingly, when the counter 50a receives 64 pulses from clock 60, notwithstanding the frequency of such pulses, a logical one (1) is transmitted through capacitance means 59 to the base B of bipolar semiconductor switching device 84 thereby turning on switching device 84.

Referring now to FIG. 6 there is shown a preferred embodiment for second switching means 90 of the control system 10 shown in FIG. 2. Second switching means 90 includes a bipolar semiconductor switching device 94 which as shown is preferrably a PNP transistor having its base B' electrically coupled through a resistance means 91 to the output j of NOR gate 82 of second gate circuit means 81 by means of an electrical conduit L113, its emitter E' electrically coupled to the power supply source 6 by means of an electrical conduit L107, and its collector C' electrically coupled through a forward biased diode 98 and a resistance means 93 to the gate G of a bidirectional semiconductor switching device 92. Bidirectional semiconductor switching device 92 as shown in FIG. 6 is preferrably a triac having one side electrically coupled to ground potential 12 and the other side electrically coupled to a machine event 8 such as an AC load 99. A "snubber network" including a resistance means 95 and a capacitance means 97 is electrically coupled in parallel with bidirectional semiconductor switching device 92 as shown to prevent such switching device 92 from momentarily turning on at the beginning of a cycle and also to ensure that the switching device 92 is turned off at the proper moment. Forward biased diode 96 is included in second switching means 90 to prevent machine event 8 from being energized when bidirectional semiconductor switching device 92 is turned off. Diode 96 and therefore second switching means 90 is electrically coupled to third gate circuit means 100 by means of an electrical conduit L114.

Illustrated in FIG. 7 is a preferred embodiment of third gate circuit means 100 of the control system 10 shown in FIG. 2. Third gate circuit means 100 includes a NOR gate 120 having at least two inputs k and n and an output o, a delay timing means 150, and a unidirectional semiconductor switching device 122 which as shown is preferrably a silicon controlled rectifier. Input k of NOR gate 120 is electrically coupled to ground potential 12 such that it always receives a logical zero (0). Input n is responsive to function control means 80 and accordingly is electrically coupled through delay timing means 150 to the output j of NOR gate 82 of second gate circuit means 81. The output o of NOR gate 120 is electrically coupled through a resistance means 121 to the gate G' of unidirectional semiconductor switching device 122 and to one side of a resistance means 125 which has its other side electrically coupled to ground potential 12 such that in response to a logical one (1) from the output o of NOR gate 120, unidirectional semiconductor switching device 122 is turned on.

Delay timing means 150 is a resistance-capacitance timing network which includes resistance means 123 and 127, capacitance means 128, and a diode 126. Delay timing means 150 is electrically coupled to the output j of NOR gate 82 by means of an electrical conduit L113 such that a logical one (1) from output j of NOR gate 82 is delayed before appearing at the input n of NOR gate 120 thereby delaying a logical one (1) to logical zero (0) transition of NOR gate 120. As will be apparent to those skilled in the art, values for resistance means 123 and 127 and capacitance means 128 may be selected so that the time interval of delay timing means 150 may be as long or as short as desired.

Unidirectional semiconductor switching device 122 has its cathode electrically coupled to ground potential 12 and its anode electrically coupled to a second machine event 8 which may include an AC buzzer 124 or a DC alarm such as a sonalert device. Normally, when unidirectional semiconductor switching device 122 is turned on, AC buzzer 124 would likewise be turned on; however, in the preferred embodiment of control system 10 shown in FIG. 2 it is desirable that the AC buzzer 124 be turned on only upon completion of the operation of AC load 99 (See FIG. 6) during any given cycle of a machine. Accordingly, AC buzzer 124 is electrically coupled through a resistance means 129 to power supply source 6 by means of an electrical conduit L107 and to second switching means 90 by means of an electrical conduit L114 such that AC buzzer 124 is only turned on by unidirectional semiconductor switching device 122 when bidirectional semiconductor switching device 92 of second switching means 90 is turned off.

Figure 8:
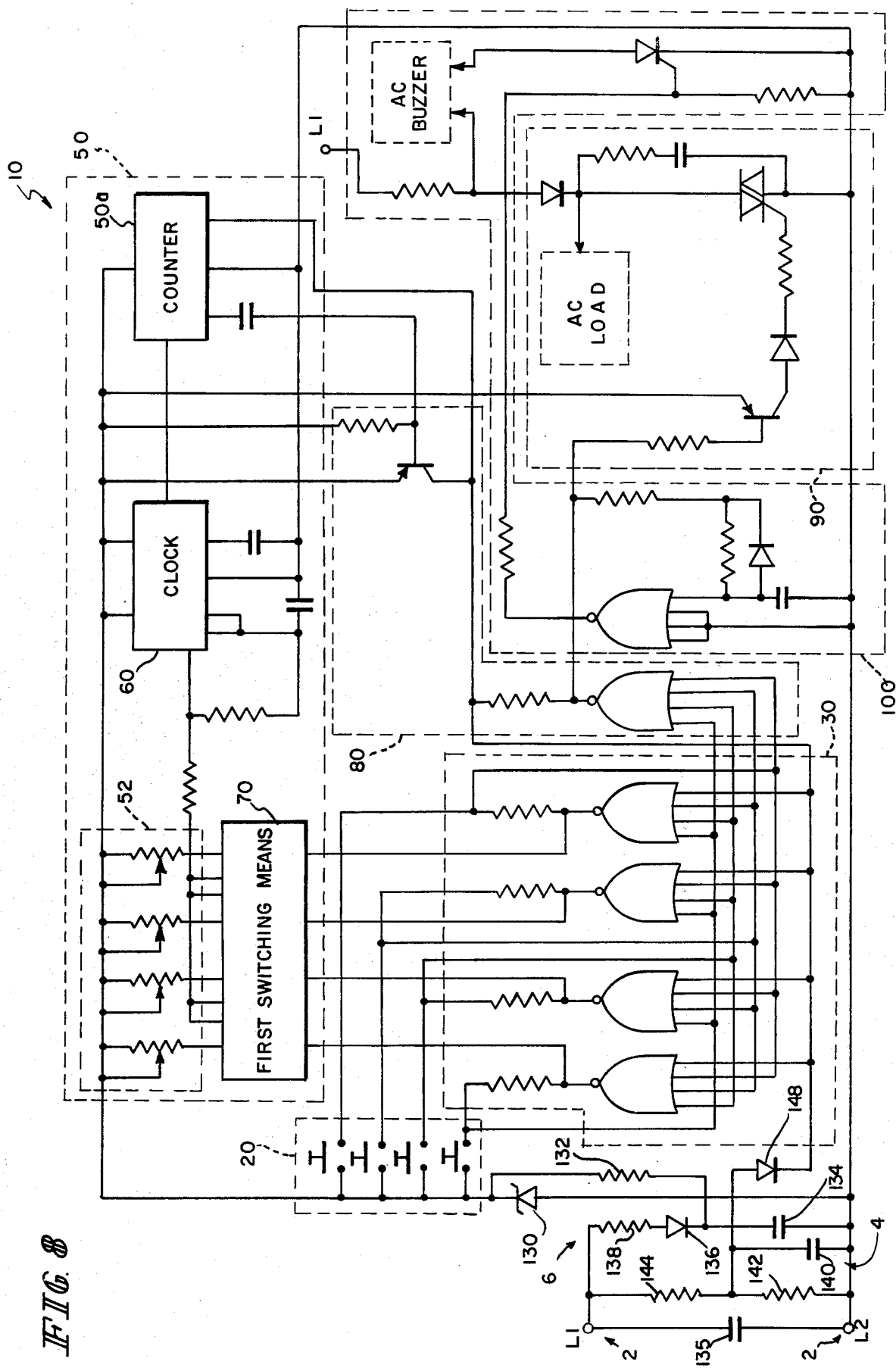
FIG. 8 is a complete schematic representation of the control system of FIG. 2.

Referring now to FIG. 8 there is shown a complete schematic diagram of the control system 10 illustrated in FIG. 2. FIG. 8 clearly illustrates the interconnection of those circuit components described hereinabove and shown in FIGS. 3,4,5,6, and 7 and further illustrates a preferred embodiment for transient protection means 4 and power supply source 6 (See FIG. 2). As shown, line power 2 includes two leads L1 and L2 bridged by a capacitance means 135 which may be electrically coupled to any AC source of power. Transient protection means 4 includes resistance means 142 and 144 coupled as a voltage divider network across line power 2, capacitance means 140, and diode 148. Transient protection means 4 is electrically coupled to power supply source 6 and through diode 148 to first gate circuit means 30 and function control means 80 to assure that the control system 10 is prepared to turn on in response to a momentary signal from programming means 20. Power supply source 6 includes resistance means 138 and 132, capacitance means 134, and diodes 136 and 130. Power supply source 6 serves to rectify the alternating reference signal of line power 2 thereby converting the AC current to DC current. Diode 130 is a zener diode connected so as to limit the DC voltage of power supply source 6. The DC voltage generated by power supply source 6 represents a logical one (1) input to control circuit 16 when programming means 20 is momentarily closed.

Referring to FIGS. 1-8 the operation of control system 10 of the present invention can best be described by describing one cycle operation of the system 10 represented by the momentary closing of one switching device 28 of programming means 20.

When a momentarily operable switching device 28 is closed by a programmer, a DC voltage generated by power supply source 6, representing a logical one (1) is applied to the inputs a of NOR gates 34,36, and 38 of first gate circuit means 30 and to the input f of NOR gate 82 of function control means 80. Accordingly, a logical zero (0) is caused to occur at each of the outputs e of NOR gates 34,36, and 38 and at the output j of NOR gate 82 of second gate circuit means 81. As previously described and illustrated in FIG. 3 the NOR gates 32,34,36, and 38 are interconnected such that in response to the logical zero (0) outputs of NOR gates 34,36, and 38 the inputs a,b,c, and d of NOR gate 32 are all logical zero (0) thereby causing the output e of NOR gate 32 to be a logical one (1). In response to the logical one (1) output of NOR gate 32 and the logical zero (0) output of NOR gate 82 the control circuit 16 latches in a functional mode of operation.

When the output j of NOR gate 82 of function control means 80 is a logical zero (0), bipolar semiconductor switching device 94 of second switching means 90 is biased and thereby turned-on through resistance means 91. The bipolar semiconductor switching device 94 in turn provides gate current for bidirectional semiconductor switching device 92 whereby it is also turned-on. In response to the turning-on of bidirectional switching device 92 an AC load 99 representing a machine event 8 is activated.

Furthermore, when the output j of NOR gate 82 of function control means 80 is a logical zero (0), the output O of NOR gate 120 of third gate circuit means 100 will be a logical one (1) since the inputs k and n of NOR gate 120 will both be logical zero (0). The logical one (1) output of NOR gate 120 will turn-on unilateral switching device 122 through its gate G'. However, as previously described, the AC buzzer 124 is precluded from being activated by unilateral switching device 122 until bilateral switching device 92 of second switching means 90 is turned-off.

Coincidentally with the turning on of bidirectional semiconductor switching device 92 which activates AC load 99 and the turning on of unidirectional semiconductor switching device 122 which will activate the AC buzzer 124 when bidirectional semiconductor switching device 92 is turned-off, the logical one (1) from the output e of NOR gate 32 is transmitted to timing means 50 and more specifically to bilateral switching device 72a of first switching means 70 to derive a timing period and thereby time a first event 8 such as the AC load 99. Bilateral switching device 72a implements the logical one (1) being transmitted to its bilateral input 73a by completing an electrical path between a variable resistance means 53 of impedance means 52 which is electrically coupled to its unilateral input 75a and the output 71a of the bilateral switching device 72a thereby activating oscillator circuit means 50b of timing means 50. The signal generated at the output 71a of bilateral switching device 72a activates clock 60 which as an oscillator generates a series of electrical pulses having a frequency determined by the value of variable resistance means 53.

The electrical pulses generated by clock 60 are counted by counter 50a. Counter 50a connected as shown in FIG. 5 may count up to 128 counts or electrical pulses. When counter 50a has counted or received 64 electrical pulses the output of counter 50a is caused to make a logical zero (0) to logical one (1) transition. It is desirable for the operation of control system 10 to use the leading edge of this logical one (1) transition to charge capacitance means 59, therefore the deactivation of first machine event will always occur when counter 50a has counted 64 electrical pulses. Accordingly, the timing period of first machine event 8 or AC load 99 being controlled by control circuit 16 is derived not from the number of pulses received or counted where the event 8 would terminate during any one cycle depending upon the number of pulses received by the counter, but rather by the frequency of a predetermined number of pulses counted by the counter. The period of time required for the counter 50a to receive or count 64 pulses will depend upon the frequency of such pulses. When the counter 50a receives the 64th pulse, the output of the counter 50a goes to a logical one (1) state. The leading edge of this logical one (1) output charges capacitance means 54 and a logical one (1) is transmitted to the base B of bipolar semiconductor switching device 84 of function control means 80 providing an emitter E - base B current which momentarily turns on bipolar semiconductor switching device 84.

When bipolar semiconductor switching device 84 is momentarily turned on a logical one (1) is transmitted from its collector C back to the counter 50a thereby resetting the counter 50a in a ready mode to count another series of 128 electrical pulses and is also transmitted to the inputs d of NOR gates 32,34, 36, and 38 of first gate circuit means 30 whereby the output of NOR gate 32 is caused to make a logical one (1) to logical zero (0) transition and accordingly the outputs e of all of the NOR gates 32,34,36, and 38 are caused to be logical zero (0). Since each of the outputs e of NOR gates 32,34,36, and 38 are respectively electrically coupled to the inputs f,g,h, and i of NOR gate 82 of second gate circuit means 81, all of the inputs f,g,h, and i of NOR gate 82 are caused to be logical zero (0) thereby causing the output j of NOR gate 82 to make a logical zero (0) to logical one (1) transition. In response to the logical zero (0) outputs of NOR gates 32,34,36, and 38 and the logical one (1) output of NOR gate 82 the control circuit 16 latches in a ready mode of operation.

When the output j of NOR gate 82 of second gate circuit means 81 is logical one (1), bidirectional semiconductor switching device 92 is turned off thereby deactivating a first machine event 8 (AC load 9) and activating a second machine event 8 (AC buzzer 124) by allowing unidirectional semiconductor switching device 122 to turn on AC buzzer 124 to indicate the end of a cycle. Furthermore, the logical one (1) output of NOR gate 82 is transmitted through delay timing means 150 (FIG. 7) to an input n of NOR gate 120 which causes the output O of NOR gate 120 to make a logical one (1) to logical zero (0) transition thereby turning off unidirectional semiconductor switching device 122 which deactivates AC buzzer 124 and completes a cycle of the machine. However, delay timing means 150 delays the logical one (1) output from NOR gate 82 for a time interval determined by the values of the resistance-capacitance network thereby allowing the AC buzzer 124 or second machine event 8 to operate during such time interval before the output O of NOR gate 120 makes the logical one (1) to logical zero (0) transition thereby deactivating the AC buzzer 124.

As will be recognized by those skilled in the art, each momentarily operable switching device 22,24,26, and 28 corresponding to a resistance means 56,55,54, and 53 respectively of impedance means 52 will represent a different cycle of a machine, whereby a first machine event 8 (AC load 99) will have a different timing period for each cycle determined by the programmer in selecting and closing one of the momentary switching devices 22,24,26, or 28 and a second machine event 8 (AC buzzer 124) will have the same time period for each cycle determined by delay timing means 150 regardless of which momentary switching device 22,24,26, or 28 is selected and closed by the programmer.

It will be further apparent to those skilled in the art that various changes in the specific embodiment illustrated and apparently modified embodiments of the present invention may be made without departing from its scope. It is intended that all material contained in the preceding description or shown on the accompanying drawings be interpreted as illustrative only and not in a limiting sense.

What is claimed is:

1. A control circuit for a machine and the like having at least one cycle made up of at least one event comprising: a plurality of momentarily operable programming means for actuating said cycle and for selectively programming a plurality of time periods of said event, first gate circuit means responsive to a momentary signal provided by said programming means for latching said control circuit in at least one mode of operation, timing mens responsive to said latching of said first gate circuit means for timing said event in accordance with a selectively programmed time period, said timing means including an oscillator circuit means for generating a series of electrical pulses having a frequency variable in accordance with said selectively programmed time periods and a counter for counting a fixed number of said electrical pulses generated by said oscillator circuit means, and function control means responsive to an electrical signal provided by said timing means when said fixed number of said electrical pulses have been counted for latching said control circuit in at least another mode of operation.

2. The control circuit as recited in claim 1 wherein said function control means latches said control circuit in said other mode of operation in response to at least one output of said first gate circuit means and said counter is reset in response to a momentary signal provided by said function control means.

3. The control circuit as recited in claim 2 wherein said first gate circuit means is latched in said other mode of operation in response to said momentary signal provided by said function control means.

4. The control circuit as recited in claim 3 wherein said first gate circuit means includes a plurality of NOR gates, each of said NOR gates having a plurality of inputs and an output.

5. The control circuit as recited in claim 4 wherein some at least of said inputs of said NOR gates of said first gate circuit means are electrically coupled to said programming means such that some at least of said NOR gates of said first gate circuit means are caused to make a logical transition in response to said momentary signal from said programming means.

6. The control circuit as recited in claim 5 wherein some at least of said NOR gates of said first gate circuit means are caused to make a logical zero transition and one at least of said NOR gates of said first gate circuit means is caused to make a logical one transition.

7. The control circuit as recited in claim 5 wherein said function control means includes a second gate circuit means and a bipolar semiconductor switching device.

8. The control circuit as recited in claim 7 wherein said second gate circuit means latches in response to said momentary signal provided by said programming means and to at least one output of said NOR gates of said first gate circuit means and includes at least one NOR gate having a plurality of inputs and an output.

9. The control circuit as recited in claim 8 wherein one at least of said inputs of said NOR gate of said second gate circuit means is electrically coupled to said programming means such that said NOR gate of said second gate circuit means is caused to make a logical transition in response to said momentary signal from said programming means.

10. The control circuit as recited in claim 9 wherein said NOR gate of said second gate circuit means is caused to make a logical zero transition.

11. The control circuit as recited in claim 8 wherein said bipolar semiconductor switching device includes a PNP transistor having its base electrically coupled to an output of said counter and its collector electrically coupled to at least one input of one at least of said NOR gates of said first gate circuit means such that said NOR gate of said first gate circuit means is caused to make a logical transition when said PNP transistor is switched on.

12. The control circuit as recited in claim 11 wherein said NOR gate of said first gate circuit means is caused to make a logical one to logical zero transition.

13. The control circuit as recited in claim 11 wherein said PNP transistor is momentarily switched on when said counter has counted said fixed number of said pulses and its collector is further electrically coupled to said counter such that said counter is reset in response to said momentary switching on of said transistor.

14. The control circuit as recited in claim 8 wherein one at least of said inputs of said NOR gate of said second gate circuit means is electrically coupled to said output of one at least of said NOR gates of said first gate circuit means such that said NOR gate of said second gate circuit means is caused to make a logical transition in response to a logical transition of said NOR gate of said first gate circuit means.

15. The control circuit as recited in claim 14 wherein said NOR gate of said second gate circuit means is caused to make a logical zero to logical one transition in response to a logical zero state of said NOR gate of said first gate circuit means.

16. The control circuit as recited in claim 8 wherein said oscillator circuit includes switching means for implementing said logical transition made by said first gate circuit means.

17. The control circuit as recited in claim 16 wherein said switching means is electrically coupled to said outputs of said NOR gates of said first gate circuit means such that said timing means is switched on in response to a logical one state of one at least of said NOR gates of said first gate circuit means.

18. The control circuit as recited in claim 1 wherein said programming means include a plurality of momentarily operable switching devices.

19. The control circuit as recited in claim 18 wherein said programming means includes at most four momentarily operable switching devices.

20. In a control circuit for controlling a machine and the like having at least one cycle made up of at least one event, a timing means for timing said event comprising: oscillator circuit means responsive to an electrical signal for deriving a plurality of time periods for said event; said oscillator circuit means including switching means for activating said oscillator circuit means, a clock responsive to said switching means for generating a series of electrical pulses, and impedance means for defining a plurality of selectable frequencies of said electrical pulses, said frequencies variable in accordance with selected time periods for said event; and a counter for counting a fixed number of said electrical pulses generated by said oscillator circuit means; said plurality of time periods substantially equivalent to various times required for said counter to count said fixed number of said electrical pulses.

21. The timing means as recited in claim 20 wherein said switching means includes a plurality of bilateral switching devices for logic implementation.

22. The timing means as recited in claim 21 wherein each of said bilateral switching devices has a unilateral input, a bilateral input, and an output.

23. The timing means as recited in claim 22 wherein said unilateral input of one at least of said bilateral switching devices is electrically coupled to said impedance means.

24. The timing means as recited in claim 23 wherein said logic is implemented through said bilateral input of said bilateral switching devices such that said impedance means is electrically coupled to said output of said bilateral switching device.

25. The timing means as recited in claim 24 wherein said impedance means include a plurality of resistance means and said output of said bilateral switching means is electrically coupled to said clock such that at least one frequency of said electrical pulses generated by said clock is defined.

26. The timing means as recited in claim 25 wherein said time periods for said event are determined by said selectable frequencies of said electrical pulses generated by said clock and said counter signals completion of a selected time period after counting said fixed number of said pulses.

27. The timing means as recited in claim 26 wherein said clock is an oscillator and said counter is a binary ripple counter.

28. A control system for controlling a machine and the like having at least one cycle made up of at least two events comprising in combination: a power supply source; a control circuit responsive to said power supply source including momentarily operable programming means for actuating said cycle and for selectively programming a plurality of time periods of a first event, first gate circuit means responsive to a momentary signal provided by said programming means for latching said control circuit in a first mode of operation wherein said first event is activated, timing means responsive to said latching of said first gate circuit means for timing said first event of said machine in accordance with a selectively programmed time period, and function control means responsive to an electrical signal provided by said timing means after said selectively programmed time period has elapsed, said function control means including second gate circuit means for latching said control circuit in a second mode of operation wherein said first event is deactivated and a second event is activated, and third gate circuit means responsive to said latching of said function control means for regulating said second event of said machine.

29. The control system as recited in claim 28 wherein said timing means includes oscillator circuit means electrically coupled to said first gate circuit means for deriving said selectively programmed time period for said first event and a counter responsive to said oscillator means for signalling the end of said first event.

30. The control system as recited in claim 29 wherein said oscillator circuit means includes switching means for activating said oscillator circuit means, a clock responsive to said switching means for generating a series of electrical pulses, and impedance means for defining a plurality of selectable frequencies of said electrical pulses, said frequencies variable in accordance with selected time periods for said first event.

31. The control system as recited in claim 29 wherein said function control means latches said control circuit in said second mode of operation in response to said first gate circuit means and said counter is reset in response to a momentary signal provided by said function control means.

32. The control system as recited in claim 31 wherein said first gate circuit means is latched in said second mode of operation in response to said momentary signal provided by said function control means.

33. The control system as recited in claim 32 wherein said first gate circuit means includes a plurality of NOR gates, each of said NOR gates having a plurality of inputs and an output.

34. The control system as recited in claim 33 wherein said second gate circuit means latches in said first mode of operation in response to said momentary signal provided by said programming means and latches in said second mode of operation in response to an output of at least one of said NOR gates of said first gate circuit means and includes at least one NOR gate having a plurality of inputs and an output.

35. The control system as recited in claim 28 further including switching means electrically coupled to said third gate circuit means and to said first event for administering a sequential activation and deactivation of said first and second events.

36. The control system as recited in claim 35 wherein said first event is activated in response to a logical zero state of said second gate circuit means and said first event is deactivated in response to a logical one state of said second gate circuit means.

37. The control system as recited in claim 36 wherein said second event is activated and deactivated in response to said logical one state of said second gate circuit.

38. The control system as recited in claim 37 wherein said third gate circuit means includes at least one NOR gate having at least two inputs and an output and delay timing means responsive to said output of said second gate circuit means for timing said second event.

39. The control system as recited in claim 38 wherein said NOR gate of said third gate circuit means is caused to make a logical one transition in response to said logical zero state of said second gate circuit means.

40. The control system as recited in claim 39 wherein said delay timing means is electrically coupled to said NOR gate of said third gate circuit means such that a logical one to logical zero transition of said NOR gate which occurs in response to a change in logical state of said second gate circuit means is delayed for a predetermined time representing a time period of said second event.

41. The control system as recited in claim 40 wherein said switching means includes a bidirectional semiconductor switching device for activating and deactivating said first event and for activating said second event.

* * * * *